United States Patent [19]

Wagner et al.

[11] Patent Number: 5,700,881
[45] Date of Patent: Dec. 23, 1997

[54] ABRASION-RESISTANT POLYESTER MIXTURE WITH ENHANCED CONSISTENCY OF PROCESSING, MONOFILAMENTS THEREFROM, AND PRODUCTION AND USE THEREOF

[75] Inventors: Hans Wagner, Bobingen; Bernd Espenschied, Augsburg, both of Germany

[73] Assignee: Hoechst Aktiengesellschaft, Frankfurt, Germany

[21] Appl. No.: 409,162

[22] Filed: Mar. 23, 1995

[30] Foreign Application Priority Data

Mar. 25, 1994 [DE] Germany ............... 44 10 399.9

[51] Int. Cl.$^6$ ............................................. C08L 67/02
[52] U.S. Cl. ................................. 525/440; 524/539
[58] Field of Search .................................. 525/440

[56] References Cited

U.S. PATENT DOCUMENTS

| | | |
|---|---|---|
| 4,279,801 | 7/1981 | Kramer et al. . |
| 4,289,173 | 9/1981 | Miller ........................... 139/383 |
| 4,569,013 | 2/1986 | Kishi et al. ................... 364/174 |
| 5,110,852 | 5/1992 | Gogolewski et al. . |
| 5,169,711 | 12/1992 | Bhatt et al. . |

FOREIGN PATENT DOCUMENTS

| | | |
|---|---|---|
| 0 349 875 | 1/1990 | European Pat. Off. . |
| 0 387 395 | 9/1990 | European Pat. Off. . |
| 25 02 466 | 9/1990 | European Pat. Off. . |
| 2 316 283 | 1/1977 | France . |
| 2 328 744 | 5/1977 | France . |
| 2502466 | 7/1976 | Germany . |
| 3249110 | 4/1983 | Germany . |
| 41 28 274 | 3/1993 | Germany . |
| WO 83/01253 | 4/1983 | WIPO . |
| WO/8400303 | 2/1984 | WIPO . |

*Primary Examiner*—Patricia A. Short
*Attorney, Agent, or Firm*—Connolly & Hutz

[57] ABSTRACT

Abrasion-resistant polyester mixture with enhanced consistency of processing, monofilaments therefrom, and production and use thereof. Described is an abrasion-resistant polyester mixture with enhanced consistency of processing, comprising a thermoplastic polyester and a thermoplastic polyurethane with or without customary nonpolymeric additives, the mixture of said polyester and said polyurethane having a melting point between 200° and 230° C. as are monofilaments made of said mixture.

Also described are the production of this abrasion-resistant polyester mixture, the production of monofilaments therefrom, and their use for producing paper machine wire cloths.

29 Claims, No Drawings

ABRASION-RESISTANT POLYESTER MIXTURE WITH ENHANCED CONSISTENCY OF PROCESSING, MONOFILAMENTS THEREFROM, AND PRODUCTION AND USE THEREOF

The present invention relates to an abrasion-resistant polyester mixture with enhanced consistency of processing, to monofilaments spun therefrom, which can be used with particular advantage for producing paper machine wire cloths, and to the production and use thereof.

Synthetic fibers and filaments and also sheetlike materials therefrom, such as woven or knitted fabrics, which are to be used for technical applications are generally exposed to far higher stresses than fiber materials for purely textile applications, for example in the clothing sector.

A very typical application for technical fiber materials is the production of paper machine wire cloths. Paper machine wire cloths are exposed in use to a bending and stretching stress, constant flection, high temperatures in a moist environment and a high abrasive stress.

Even in these mechanical and chemical stresses, paper machine wire cloths must keep their strength, dimensional stability and planarity for as long as possible; that is, they may also only show minimal swelling due to water absorption.

It is especially the abrasive stress, due on the underside to rubbing of the wire cloths against support elements of the paper machine and against sealing elements above the suction boxes, where the paper web is drained, and on the inside of the wire cloths to rubbing of the filaments against each other and to the flow-through of water containing abrasive paper filler, which has a very great effect on wire cloth life.

It has proved to be extremely difficult to provide a wire cloth material which is sufficiently resistant to all the stresses mentioned.

The original Fourdrinier papermaking machine wire cloths were in fact made of metal wires, the metal used being phosphorus bronze.

Although these metal wires are very resistant to the high temperatures and the hydrolytic attack, they have unsatisfactory abrasion characteristics. It has also already been proposed to make paper machine wire cloths from polyester filaments, especially polyethylene or polybutylene terephthalate filaments, or from polyamide filaments, for example nylon-6 or nylon-6,6 filaments. It is true that polyester filaments possess good dynamic stability and, because of their low moisture regain, good dimensional stability, but their chemical resistance at high temperatures generally leaves something to be desired, and their abrasion resistance in particular does not meet the requirements of papermaking machine manufacturers.

Polyamide filaments, by contrast, do show good abrasion resistance, but have a high moisture regain coupled with high swelling and low dimensional stability.

Various publications, for example U.S. Pat. No. 4,529, 013, U.S. Pat. No. 4,289,173 and DE-A-2 502 466, have already described attempts to combine polyester and polyamide filaments to produce paper machine wire cloths which are better equipped to meet the high requirements.

However, these attempts have only been partially successful; more particularly, new difficulties arise as a result of using different filament materials in one and the same fabric.

Another way was proposed in EP-A-0 387 395, which recommends weaving paper machine wire cloths from polyester filaments, especially polyethylene terephthalate filaments, using a weft consisting at least partly of filaments of a polyester containing 10 to 40% by weight of a thermoplastic urethane and up to 5% by weight of a hydrolysis stabilizer.

A similar proposal is known from DE-T-3 249 110, which recommends producing filaments for paper machine wire cloths from a mixture of a polyester, a polyester stabilizer and a "thermoplastic material", wherein the "thermoplastic material" used is said to be a thermoplastic polyurethane or a polyether-ester block copolymer.

It is stated in both documents that these polyester mixtures result in filaments of improved hydrolysis resistance and improved abrasion resistance.

However, a serious disadvantage of these known polyester mixtures is that melt spinning these mixtures gives rise to the formation, in the melt, of gas bubbles which reduce the consistency of processing. This evolution of gas is presumably due to the onset of the decomposition of the polyurethane component.

It has now been found that it is possible to produce polyester mixtures which are processible, especially spinnable, without noticeable gas evolution and which are spinnable into the filaments which combine the good mechanical properties of polyester with appreciably improved abrasion characteristics.

The present invention accordingly provides an abrasion-resistant polyester mixture with enhanced consistency of processing, comprising a thermoplastic polyester and a thermoplastic polyurethane with or without customary non-polymeric additives, the mixture of said polyester and said polyurethane having a melting point between 200° and 230° C.

The polymer material of the abrasion-resistant polyester mixture of the present invention contains from 60 to 95% by weight, preferably from 70 to 90% by weight, of said thermoplastic polyester and from 5 to 40% by weight, preferably from 10 to 30% by weight, of said thermoplastic polyurethane.

The thermoplastic polyester of the abrasion-resistant polyester mixture of the present invention has a glass transition point of 68° to 82° C., preferably 72° to 80° C., a crystallization point of 135° to 155° C., preferably 140° to 150° C., and a melting point within the range from 175° C. to 235° C.

The melting point range of the abrasion-resistant polyester mixture of the present invention and the temperature ranges of the glass transition point, of the crystallization point and of the melting point of the thermoplastic polyester present in the abrasion-resistant polyester mixture of the present invention are based on a measurement in a differential scanning calorimeter (DSC) at a temperature rise rate of 10° C. per minute.

The polyester of the abrasion-resistant polyester mixture of the present invention preferably has a melt viscosity of 445 to 482 Pa.s, preferably 455 to 475 Pa.s, especially of 460 to 468 Pa.s, when measured at 245±2° C. and a shear gradient of 200±5 s$^{-1}$, and of 245 to 282 Pa.s, preferably 250 to 272, especially of 255 to 270 Pa.s when measured at the same temperature and a shear gradient of 1,200±5 s$^{-1}$.

The thermoplastic polyesters of the abrasion-resistant polyester mixture of the present invention consist predominantly, i.e. at least 70 mol %, based on the totality of all polyester units, of common units derived from aromatic dicarboxylic acids and from aliphatic diols. Common aromatic dicarboxylic acid units are derived from benzene-dicarboxylic acids, especially terephthalic acid and isophthalic acid; common diols have 2–4 carbon atoms, and ethylene glycol is particularly suitable.

The remaining 30 mol %, based on the totality of all polyester units, are then made up of dicarboxylic acid units and diolunits which differ from the aromatic units forming the predominant portion .of the units and which act as modifiers and make it possible for the person skilled in the art to influence the physical and chemical properties of the filaments in a specific manner.

Examples of such dicarboxylic acid units are radicals of aromatic dicarboxylic acids differing from the aromatic dicarboxylic acid units forming the predominant portion of the dicarboxylic acid units, or radicals of araliphatic dicarboxylic acids having one or more, preferably one or two, fused or unfused aromatic nuclei, for example of isophthalic acid, 5-sulfoisophthalic acid, 5-sulfopropoxyisophthalic acid, naphthalene-2,6-dicarboxylic acid, 4,4'-biphenyldicarboxylic acid, p-phenylenediacetic acid, 4,4'-oxydiphenyldicarboxylic acid or diphenoxyalkanedicarboxylic acid, or radicals of cyclic or acyclic aliphatic dicarboxylic acids, for example trans-hexahydroterephthalic acid, 1,2-cyclobutanedicarboxylic acid, glutaric acid, adipic acid, sebacic acid; examples of modifying diol radicals are those of branched and/or long-chain diols having 3 to 10, preferably 3 to 6, carbon atoms, for example of 1,3-propanediol, 1,4-butanediol, 1,6-hexanediol, 2,2-dimethylpropanediol or 2-ethyl-1,6-hexanediol, or of cyclic diols, for example of 1,4-hydroxymethylcyclohexane, or of diols that contain ether groups, for example of diethylene or triethylene glycol, or, if present in a small amount, of polyglycol having a molecular weight of about 500–2,000.

Particular preference for use as constituents of the abrasion-resistant polyester mixture of the present invention is given to those thermoplastic polyesters whose polymer chains, based on the totality of all polyester units, is composed of 35 to 47 mol % of units of the formula —CO—$A^1$—CO— (I)

3 to 15 mol % of units of the formula —CO—$A^2$—CO— (II)

35 to 50 mol % of units of the formula —O—$D^1$—O— (III)

0 to 15 mol % of units of the formula —O—$D^2$—O— (IV)

where $A^1$ denotes aromatic radicals having 5 to 12, preferably 6 to 10, carbon atoms, $A^2$ denotes aromatic radicals differing from $A^1$ or araliphatic radicals having 5 to 16, preferably 6 to 12, carbon atoms or cyclic or acyclic aliphatic radicals having 2 to 10 carbon atoms, preferably 4 to 8 carbon atoms, $D^1$ denotes alkylene or polymethylene groups having 2 to 4 carbon atoms or cycloalkane or dimethylenecycloalkane groups having 6 to 10 carbon atoms, $D^2$ denotes non-$D^1$ alkylene or polymethylene groups having 3 or 4 carbon atoms or cycloalkane or dimethylenecycloalkane groups having 6 to 10 carbon atoms or straight-chain or branched alkanediyl groups having 4 to 16, preferably 4 to 8, carbon atoms or radicals of the formula —$(C_2H_4—O)_m$—$C_2H_4$—, where n is an integer from 1 to 40, with m=1 or 2 being preferred for proportions of up to 20 mol % and groups with m=10 to 40 preferably being present only in proportions of below 5 mol %.

The polyesters present in the polyester mixture of the present invention have a relative viscosity of advantageously 1.6 to 2.2, preferably 1.8 to 2.0, measured in a 1% strength by weight solution of the polyesters in dichloroacetic acid at 25° C.

Preferred aryl $A^1$ is 1,4-phenylene, preferred aryl $A^2$ is in particular 1,3-phenylene or else 1,4-, 1,5-, 1,8-, 2,6- and 2,7-naphthylene, 4,4'-biphenylene, furylene or a radical of the formula VI

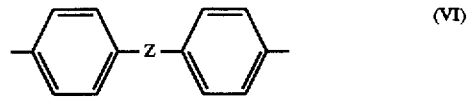

where Z is polymethylene or alkylene of 1 to 4 carbon atoms, —$SO_2$—, —COO—, —O— or —S—.

Radicals denoted by $A^1$ and $A^2$ can all be identical within the scope of the definition given, or they can be different.

More particularly, the abovementioned radicals represented by $A^1$ can be present in the polyester chain individually or mixed. It is preferable for $A^1$ to be formed by only one or two members of the group of radicals specified for $A^1$. Any desired further modification of the polyester chain is then preferably effected through other units within the scope of the definition for $A^2$.

For instance, the aromatic radicals $A^1$ can all be 1,4-phenylene radicals or they can be composed for example in a molar ratio of 4:6 to 6:4 of 2,6-naphthylene radicals and 4,4'-biphenyldiyl radicals.

Preference is given to polyesters in which $A^1$ is 1,4-phenylene and especially to those in which $A^2$ is likewise aryl.

Similarly, the radicals denoted by $D^1$ and $D^2$ can all be identical within the scope of the definition given, or they can be different.

More particularly, the abovementioned radicals represented by $D^1$ can be present in the polyester chain individually or mixed. It is preferable for $D^1$ to be formed by only one or two members of the group of radicals specified for $D^1$. Any desired further modification of the polyester chain is then preferably effected through other units within the scope of the definition for $D^2$.

For instance, the radicals $D^1$ can all be ethylene radicals or they can be composed for example in a molar ratio of 10:1 to 1:10 of ethylene-1,4-dimethylenecyclohexane radicals.

Particular preference is given to polyesters in which $D^1$ is exclusively ethylene.

Particular preference is further given to polyesters in which $A^1$ is 1,4-phenylene and $A^2$ is 1,3-phenylene.

Particular preference is further given to polyesters with 40 to 47 mol % of units of the formula I, 3 to 10 mol % of units of the formula II, 48 to 50 mol %, especially 50 mol %, of units of the formula III and 0 to 2, especially 0, mol % of units of the formula IV.

The nuclei of the aromatic and araliphatic radicals represented by $A^1$ and $A^2$ may in turn additionally carry one or two substituents. In this case, however, it is preferable for only a proportion of up to 15%, especially up to 7%, of the aromatic radicals present to be substituted. Preferably, the substituted aromatic radicals each carry only one substituent. Particularly suitable substituents are alkyl having 1 to 4 carbon atoms, alkoxy of 1 to 4 carbon atoms, chlorine and sulfo.

Radicals derived from aliphatic dicarboxylic acids and aromatic radicals which yield angled chains, for example isophthalic radicals, or which comprise rather bulky aromatic nuclei, such as the naphthalene nucleus, and also the long-chain groups Y are incorporated in particular into the polyester chain when a further modification of the properties of the polyester is desired. Preference is given to polyesters which contain less than 7% of these modifying components.

The thermoplastic polyurethane present in the abrasion-resistant polyester mixture of the present invention is primarily characterized by application-specific physical properties.

It preferably has a shear modulus of 8 to 80 MPa, preferably 20 to 50 MPa, within the temperature range from 20° to 60° C.,

- a mechanical loss factor tan (δ) of $0.8*10^{-2}$ to $1.2*10^{-1}$ within the temperature range from 20° to 60° C.,
- a Shore A hardness, measured in accordance with DIN 53505, of 82 to 100, and
- a Shore D hardness, measured in accordance with DIN 53505, of 30 to 60.

It is further preferable for the thermoplastic polyurethane of the abrasion-resistant polyester mixture of the present invention to have a tensile strength, measured in accordance with DIN 53504, of 32 to 42 MPa, a breaking extension, measured in accordance with DIN 53504, of 420 to 520% and an impact toughness, measured in accordance with DIN 53515 of 32 to 45%.

The thermoplastic polyurethane of the abrasion-resistant polyester mixture of the present invention conforms to the idealized formula V

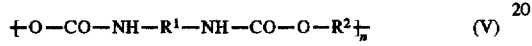

(V)

where $R^1$ is a bivalent, aromatic or araliphatic radical of 6 to 18 carbon atoms with a substituted or unsubstituted aromatic ring or with two fused or unfused, substituted or unsubstituted aromatic rings, $R^2$ is a polyether unit of the formula VI

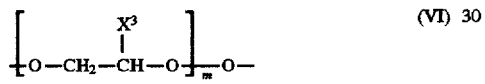

(VI)

where $X^3$ is hydrogen or methyl, and m is from 10 to 100, preferably from 10 to 30, or the radical of polytetrahydrofuran or preferably a polyester unit of the formula VII

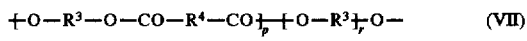

(VII)

where $R^3$ is straight-chain or optionally branched alkanediyl or oxaalkanediyl having 2 to 8, preferably 2 to 6, carbon atoms, for example ethylene, 1,3-propanediyl, 1,4-butanediyl, 1,6-hexanediyl, 2-ethyl-1,6-hexanediyl, 2,2-dimethyl-1,3-propanediyl, or the bivalent oxaalkanediyl radicals derived from diethylene glycol or triethylene glycol, $R^4$ is alkanediyl having 2 to 6, preferably 2 to 4, carbon atoms, cycloalkanediyl such as 1,4- or 1,3-cyclohexanediyl or a bivalent aromatic radical having 6 to 12 carbon atoms, preferably 6 to 10 carbon atoms, especially 1,3- or 1,4 -phenylene, p is a number so that R4 has a molecular weight of 1,000 to 2,000 (p=5 to 12, preferably 8 to 11) and r is either 0 or 1.

The polyurethane present in the abrasion-resistant polyester mixture of the present invention was said above to conform to an "idealized" formula. This means that the formula does not strictly reflect the real structure of the polyurethane. Polyurethanes, as is be known, are produced by reacting diisocyanates with hydroxyl-containing polyethers or polyesters. The high reactivity of the diisocyanates, however, may also give rise, to a minor extent, to secondary reactions which lead to products whose structure is not described by the indicated formula.

Nevertheless, the idealized formula is, to the person skilled in the art, a completely adequate description of the polyurethane used, since it reveals which starting materials were combined to form the product in question. The person skilled in the art is thus enabled by the formula to prepare the thermoplastic polyurethane present in the abrasion-resistant polyester mixture of the present invention.

The abrasion-resistant polyester mixture of the present invention preferably comprises a thermoplastic polyurethane of the idealized formula V where $R^1$ is phenylene, naphthalene or a unit of the formulae VIII or IX

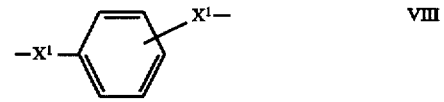

VIII

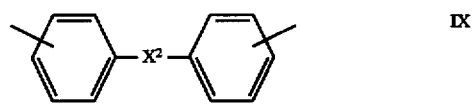

IX which may each carry substituents, where $X^1$ is a bivalent aliphatic radical having 1 to 3 carbon atoms and $X^2$ is a direct bond, a bivalent aliphatic radical having 1 to 3 carbon atoms, —CO—, —SO$_2$— or —NH—CO—NH—.

Particular preference is given to those abrasion-resistant polyester mixtures of the present invention which comprise a thermoplastic polyurethane of the idealized formula V where $R^1$ is a unit of the formula X

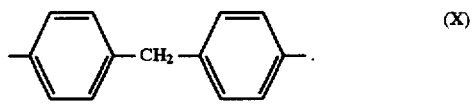

(X)

The aromatic rings present in the thermoplastic polyurethane may be unsubstituted or carry one or two substituents selected from the group consisting of —SO$_3$H and —CH$_3$.

Some thermoplastic polyurethanes having the above-indicated features are commercially available. A polyurethane which is very suitable for use as a constituent of the abrasion-resistant polyester mixture of the present invention is for example ®DESMOPAN VPKA 8392 from BAYER AG. The abrasion-resistant polyester mixture of the present invention may comprise up to 10% by weight of nonpolymeric substances, such as modifiers, fillers, pigments, dyes, antioxidants, hydrolysis, light and temperature stabilizers and/or processing aids. Particularly preferred abrasion-resistant polyester mixtures of the present invention comprise in particular up to 10% by weight, preferably up to 5% by weight, of polyester stabilizers which protect the polyester in the mixture against hydrolysis and thermal degradation. Of particular advantage for use as stabilizers are those compounds capable of reacting with the terminal carboxyl groups of the polyester to form nonacid end groups, for example glycidyl ethers, keteneimines, aziridines, isocyanates. Of particular advantage for use as stabilizers are carbodiimides and polycarbodiimides, especially if used combined with one another.

The abrasion-resistant polyester mixtures of the present invention are homogeneous mixtures of the mixture components. "Homogeneous" for the purposes of this invention, however, is not restricted to solution-like, i.e. molecularly disperse, distributions, but the mixture may also consist of a uniform mixture of the pulverulent ingredients or of a uniform mixture of pellets or chips of the mixture constituents. What matters is merely that the mixtures can be melted in an extruder to form a melt which retains the same composition during extrusion, thus always producing an extrudate of unambiguously defined composition. In the case of abrasion-resistant polyester mixtures of the present invention which consist of a homogeneous mixture of powders or even larger particles, for example pellets, any non-polymeric constituents of the abrasion-resistant polyester mixture of the present invention will generally be located in the particles of the polyester and/or of the polyurethane, preferably in the polyester particles.

The abrasion-resistant polyester mixture of the present invention is produced by mixing the above-described thermoplastic polyesters and polyurethanes in suitable known mixing apparatus, for example mixing drums or kneaders. These polymeric constituents can be present in solid form, for example as powders, chips or pellets, or as melts. It is of course also possible to stir a pulverulent ingredient into a melt of the other. The choice of mixing apparatus is made on the basic of suitability for the job in hand; that is, the chosen mixing apparatus must be adapted to the physical state of the ingredients to be mixed. If the ingredients melt in the course of being mixed, which given thorough mixing of the melt leads to particularly good or even molecularly disperse homogenization of the abrasion-resistant polyester mixture of the present invention, extrusion and pelletization of the melt can be used to obtain the abrasion-resistant polyester mixture of the present invention in the form of uniform pellets or chips. Nonpolymeric ingredients are generally incorporated into one or both of the polymer components, preferably into the polyester component. A particularly advantageous embodiment of producing the abrasion-resistant polyester mixture of the present invention, comprises combining the polymer components, which may contain nonpolymeric ingredients already present, in the desired mixing ratio immediately upstream of the extruder inlet. Homogenization of the mixture is then effected in the feeding and mixing zone of the extruder screw. The material mixed and homogenized in the extruder can then be extruded directly to the desired articles, preferably the monofilaments of the present invention.

The present invention further provides monofilaments consisting of the above-described abrasion-resistant polyester mixture of the present invention. These monofilaments have a linear density of 70 to 40,000 dtex, preferably 157 to 2,200 dtex, an initial modulus of 400 to 800, preferably 500 to 700, cN/tex, a tenacity of 15 to 30, preferably 20 to 30, cN/tex, a breaking extension of 50 to 70%, preferably 60 to 65%, a 180° C. dry heat shrinkage of 10 to 40%, preferably 15 to 20%, with the development of a shrinkage tension of 0.1 to 0.5, preferably 0.2 to 0.3, cN/tex, and a boil off shrinkage of 3 to 10%, preferably 4 to 7%.

The monofilaments can be produced with different cross-sectional shapes, including as hollow filaments. A round cross section is preferred.

These monofilaments can be used with particular advantage for the production of paper machine wire cloths.

To produce the monofilaments of the present invention, the abrasion-resistant polyester mixture of the present invention is dried directly prior to spinning, preferably by heating in a dry atmosphere or under reduced pressure. Thereafter the abrasion-resistant polyester mixture of the present invention is melted and homogenized in an extruder. Alternatively, as stated above, the thermoplastic polyester and the polyurethane components of the abrasion-resistant polyester mixture of the present invention can also be separately predried and fed into the extruder in the desired mixing ratio. The melt completely homogenized in the extruder is filtered in a customary spin pack and extruded through a spinneret at a melt temperature of 185° to 245° C., preferably 210° to 235° C. The extruded molten filament is cooled in a spin bath (for example water at about 70° C.) and wound up or taken off at a speed which is greater than the extrusion speed of the copolyester melt so that a drawdown of 1:2 to 1:4, preferably 1:2.5 to 1:3.5, results. The extrusion speed is advantageously set in such a way that, in the interests of economical production of the monofilaments of the present invention, a spinning take-off speed of 5 to 30, preferably 15 to 25, m per minute can be used.

Of particular importance for the production of the monofilaments of the present invention is the maintenance of the melt temperature range mentioned above. This temperature ensures the production of filaments which are in accordance with the present invention and have optimum application properties. This temperature range also means no nuisance due to eliminated diisocyanate. Nor does the abrasion-resistant polyester mixture of the present invention incur any significant weight loss on spinning due to the elimination of diisocyanate from the polyurethane portion of the abrasion-resistant polyester mixture of the present invention. An increase in the melt temperature, however, leads to a distinct loss of weight of the abrasion-resistant polyester mixture of the present invention as a consequence of unacceptable elimination of diisocyanates. Thermogravimetric studies of the abrasion-resistant polyester mixture of the present invention have shown that the temperature range of up to not more than 250° C., in which the spinning of the polyester mixture of the present invention takes place, results in a loss of substance of only about 0.3% by weight (without moisture loss), whereas the spinning temperature of the known polyethylene terephthalate/polyurethane mixtures (>290° C.) gives rise to a loss of substance above 3% by weight.

The filament thus produced is then subjected to an afterdraw, preferably in a plurality of stages, in particular in two or three stages, with a total draw ratio of 1:4 to 1:8, preferably 1:5 to 1:7, and subsequently heat-set at temperatures of 160° to 240° C., preferably 170° to 210° C., operating at constant length or with a permitted shrinkage of 10 to 30%, preferably 15 to 25%, being possible.

The resulting copolyester monofilaments of the present invention have an excellent abrasion-resistance. For instance, under the abrasion test described below a monofilament according to the present invention which is composed of the abrasion-resistant polyester mixture according to the present invention loses only a fraction of the weight which a conventional polyester yarn for industrial use loses under the same test conditions.

The abrasion tendency was measured as follows: 10,000 m of monofil were pulled at 100 m/min through a weighed test device consisting of a grid of 20 metal wires having a wire diameter of 0.5 mm and spaced 2 mm apart and a collecting dish for abraded-off material, situated underneath the grid and firmly connected to the grid. After the monofilament has passed through, the test device (consisting of grid+receiving dish) is reweighed. Any increase in the weight of the test device is due to abraded-off material and is a measure of the abrasion resistance.

The present invention further provides paper machine wire cloths containing the abrasion-resistant monofilaments of the present invention or comprising the abrasion-resistant monofilaments of the present invention as abrasion-resistant component, and the use of these monofilaments in or for the production of paper machine wire cloths, especially of the endless type. Such a forming fabric in a paper machine generally has a single- to three-layer construction and a basis weight of 100 to 800, preferably 200 to 600, g/m². It is constructed from monofilaments having a linear density preferably within the range from 157 to 2,200 dtex. The monofilaments used according to the present invention have a modulus of elasticity of greater than 5 N/tex, a tenacity of 20 to 30 cN/tex, a breaking extension of 50 to 70% and a 180° C. hot air shrinkage of 15 to 40%.

The monofilaments are woven up to the paper machine wire cloths on conventional full-width weaving machines using the machine parameters also customary in the weaving of polyethylene terephthalate. For instance, good wire cloth fabric is obtained on weaving monofills having a diameter of 0.17 mm in warp with face wefts of 0.2 mm and back wefts of 0.22 mm. The fabric possesses very good dimensional stability and abrasion resistance.

However, paper machine wire cloths having superior abrasion properties can be obtained if the abrasion-resistant monofilaments of the present invention are included only in an effective proportion, in which case it is advantageous for the areas of the wire cloth which are exposed to a particularly high abrasion to be rich in the filaments of the present invention. The fabric obtained is generally aftertreated in an appropriately dimensioned heat-setter in order that the specific wire cloth properties desired in an individual case may be conferred.

The paper machine wire cloth fabric produced in this way from or with monofilaments of the present invention has better abrasion resistance and hence a significantly longer life in the paper machine compared with material produced from conventional polyethylene terephthalate monofilaments.

The Examples which follow illustrate the production of monofilaments according to the present invention and their appreciably improved abrasion characteristics compared with conventional polyethylene terephthalate monofilaments.

EXAMPLE 1

An abrasion-resistant polyester mixture according to the present invention is produced by mixing 85 parts by weight of a polyethylene terephthalate isophthalate having a proportion of 10 mol % of isophthalic acid in the polyester chain and a melting point of 229° C. with 15 parts by weight of ®DESMOPAN VPKA 8392. The mixture is introduced into an extruder, where it is melted and homogenized. The melt temperature at the extruder exit is 225° C. Using a spinning pump this melt is forced under a pressure of 220 bar through spinneret holes 0.6 mm in diameter and consolidated in a cooling bath using hot water at 70° C. The monofilaments thus obtained are then drawn in two stages, using a draw ratio of 5.8 in the first stage and of 1.1 in the second stage. The monofilament is then set at 200° C. with 21% shrinkage being permitted.

The wound-up monofilaments have a diameter of 0.2 mm, a breaking strength of 23 cN/tex at a breaking extension of 65%, and a residual shrinkage at 180° C. of 15% (with a shrinkage force of 12 cN).

EXAMPLE 2

A mixture of 70 parts by weight of chips of the isophthalic acid-modified polyethylene terephthalate used in Example 1 and 30 parts by weight of chips of ®DESMOPAN VPKA 8392 is melted in an extruder to form a hot melt at 230° C. A spinning pump forces this melt through spinneret holes 0.8 mm in size. The monofills obtained are cooled in hot water at 70° C. and then drawn in two stages using a first stage draw ratio of 6.1 and a second stage draw ratio of 1.2. They are then set at 180° C. with 21% of shrinkage being permitted. The ready-produced monofilament has a diameter of 0.2 mm. The breaking strength is 25 cN/tex at a breaking extension of 60%. The residual shrinkage at 180° C. is 39% with a shrinkage force of 10 cN.

The monofilaments produced according to Examples 1 and 2 of the present invention were tested in respect of abrasion resistance by the above-described method against a monofilament of the same linear density produced from the polyester used in the Examples, i.e. without polyurethane.

The test results obtained are shown in the table below.

TABLE

| | 0% of TPU[1] Control | 15% of TPU[1] Example 1 | 30% of TPU[1] Example 2 |
|---|---|---|---|
| Weight increase of measuring device = abraded-off material [mg] | 0.7 | 0.2 | <0.1 |

[1]TPU = thermoplastic polyurethane

What is claimed is:

1. An abrasion-resistant polyester mixture with enhanced consistency of processing, comprising
   from 60 to 95% by weight of a thermoplastic polyester and from 5 to 40% by weight of a thermoplastic polyurethane wherein the polyester contains
   (A) at least 70 mol %, based on the totality of all polyester units, of units derived from aromatic dicarboxylic acids and from aliphatic diols, and
   (B) not more than 30 mol %, based on the totality of all polyester units, of dicarboxylic acid and diol units differing from the aromatic units forming the predominant portion of the units and
   wherein the polyester has
   a melting point within the range from 175° C. to 235° C., the mixture of said polyester and said polyurethane having a melting point between 200° and 230° C. and said polyester mixture has a lost of substances of only about 0.3 percent by weight at a temperature up to not more than 250° C.

2. The abrasion-resistant polyester mixture of claim 1 comprising up to 10% by weight of nonpolymeric substances.

3. The polyester mixture as claimed in claim 2, wherein the nonpolymeric substances are modifiers, fillers, pigments, dyes, antioxidants, stabilizers, processing aids, or mixtures thereof.

4. The abrasion-resistant polyester mixture of claim 1 wherein the polyester has a melt viscosity of 445 to 482 Pa.s, when measured at 245±2° C. and a shear gradient of 200±5 s⁻¹, and of 245 to 282 Pa.s when measured at the same temperature and a shear gradient of 1,200±5 s⁻¹.

5. The abrasion-resistant polyester mixture of claim 1 wherein the polyester contains at least 70 mol %, based on the totality of all polyester units, of units derived from aromatic dicarboxylic acids and from aliphatic diols, and not more than 30 mol %, based on the totality of all polyester units, of radicals derived from araliphatic dicarboxylic acids having one or more fused or unfused aromatic nuclei, or from cyclic or acylic aliphatic dicarboxylic acids having 4 to 12 carbon atoms and diol units derived from branched and/or long-chain diols having 3 to 10 carbon atoms, or of cyclic diols, or of diols that contain ether groups, or, if present in a small amount, of polyglycol having a molecular weight of about 500–2,000.

6. The abrasion-resistant polyester mixture of claim 5, wherein, if radicals derived from araliphatic dicarboxylic acids are present, they have one or two fused or unfused aromatic nuclei.

7. The abrasion-resistant polyester mixture as claimed in claim 5, wherein if diol units are present as long-chain diols, they have 3 to 6 carbon atoms.

8. The abrasion-resistant polyester mixture of claim 1 wherein the polyester, based on the totality of all polyester units, comprises 35 to 47 mol % of units of the formula —CO—A$^1$—CO— (I)

3 to 15 mol % of units of the formula —CO—A$^2$—CO— (II)

35 to 47 mol % of units of the formula —O—D$^1$—O— (III)

3 to 15 mol % of units of the formula —O—D$^2$—O— (IV)

where

A$^1$ denotes aromatic radicals having 5 to 12, carbon atoms,

A$^2$ denotes aromatic radicals differing from A$^1$ or araliphatic radicals having 5 to 16 carbon atoms or cyclic or acyclic aliphatic radicals having 2 to 10 carbon atoms, D$^1$ denotes alkylene or polymethylene groups having 2 to 4 carbon atoms or cycloalkane or dimethylene-cycloalkane groups having 6 to 10 carbon atoms, D$^2$ denotes non-D$^1$ alkylene or polymethylene groups having 3 to 4 carbon atoms or cycloalkane or dimethylenecycloalkane groups having 6 to 10 carbon atoms or straight-chain or branched alkanediyl groups having 4 to 16 carbon atoms or radicals of the formula —(C$_2$H$_4$—O)$_m$—C$_2$H$_4$—, wherein m is an integer from 1 to 40.

9. The abrasion-resistant polyester mixture as claimed in claim 7, wherein

A$^1$ denotes aromatic radicals having 6 to 10 carbon atoms,

A$^2$ denotes aromatic radicals differing from A$^1$ or araliphatic radicals having 6 to 12 carbon atoms or cyclic or acyclic aliphatic radicals having 4 to 8 carbon atoms, D$^2$ denotes non-D$^1$ alkylene or polymethylene groups having 3 to 4 carbon atoms, or cycloalkane or dimethylene cycloalkane groups having 6 to 10 carbon atoms or straight-chain or branched alkanediyl groups having 4 to 8 carbon atoms or radicals of the formula —(C$_2$H$_4$—O)$_m$—C$_2$H$_4$—, wherein M is 1 or 2 when proportions of up to 20 mole % are present, and M=10 to 40 when proportions of below 5 mole % are present.

10. The abrasion-resistant polyester mixture of claim 1 wherein the polyesters present therein have a relative viscosity from 1.6 to 2.2 measured in a 1% strength by weight solution of the polyesters in dichloroacetic acid at 25° C.

11. The abrasion-resistant polyester mixture of claim 1 wherein the polyurethane has a shear modulus of 8 to 80 MPa within the temperature range from 20° to 60° C., a mechanical loss factor tan (δ) of $0.8*10^{-2}$ to $1.2*10^{-1}$ within the temperature range from 20° to 60° C., a Shore A hardness, measured in accordance with DIN 53505, of 82 to 100, a Shore D hardness, measured in accordance with DIN 53505, of 30 to 60, a tensile strength, measured in accordance with DIN 53504, of 32 to 42 MPa, a breaking extension, measured in accordance with DIN 53504, of 420 to 520% and an impact toughness, measured in accordance with DIN 53515 of 32 to 45%.

12. The abrasion-resistant polyester mixture of claim 1, wherein the polymer material contains from 70 to 90% by weight of said thermoplastic polyester and from 10 to 30% by weight of said thermoplastic polyurethane.

13. The abrasion-resistant polyester mixture as claimed in claim 1, wherein the polyester has a glass transition point of 72° to 80° C., a crystallization point of 140° to 150° C., and a melting point within the range of from 175° C. to 235° C.

14. The abrasion-resistant polyester mixture of claim 1, wherein the polyester has a melt viscosity of from 455 to 475 Pa.S, when measured at 245+ or −2° C. and a shear gradient of 200+ or −5 s$^{-1}$, and a melt viscosity of 250 to 272 Pa.S when measured at the same temperature and a shear gradient of 1,200+ or −5 s$^{-1}$.

15. The abrasion-resistant polyester mixture of claim 1, wherein the polyester has a melt viscosity of from 460 to 468 Pa.S, when measured at 245+ or −2° C. and a shear gradient of 200+ or −5 s$^{-1}$, and a melt viscosity of 255 to 270 Pa.S when measured at the same temperature and a shear gradient of 1,200+ or −5 s$^{-1}$.

16. The abrasion-resistant polyester mixture of claim 1, wherein the polyester has a relative viscosity of from 1.8 to 2.0 measured in a 1% strength by weight solution of the polyesters in dichloroacetic acid at 25° C.

17. The abrasion-resistant polyester mixture of claim 1, wherein the polyurethane has a shear modulus of 20 to 50 MPa within the temperature range of 20° to 60° C.

18. The abrasion-resistant polyester mixture of claim 1 wherein the thermoplastic polyurethane conforms to the idealized formula V

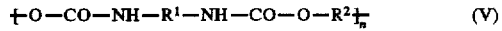  (V)

where

R$^1$ is a bivalent, aromatic or araliphatic radical having 6 to 18 carbon atoms with a substituted or unsubstituted aromatic ring or with two fused or unfused, substituted or unsubstituted aromatic rings, R$^2$ is a polyether unit of the formula VI

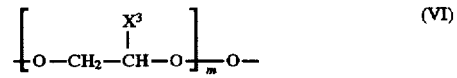  (VI)

where

X$^3$ is hydrogen or methyl, and m is from 10 to 100, or the radical of polytetrahydrofuran or a polyester unit of the formula VII

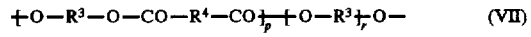  (VII)

where

R$^3$ is straight-chain or optionally branched alkanediyl or oxaalkanediyl having 2 to 8 carbon atoms or bivalent oxaalkanediyl radicals derived from diethylene glycol or triethylene glycol, R$^4$ is alkanediyl having 2 to 6 carbon atoms, cycloalkanediyl or a bivalent aromatic radical having 6 to 12 carbon atoms, p is 5 to 12 and r is either 0 or 1.

19. The abrasion-resistant polyester mixture as claimed in claim 18, wherein M is from 10 to 30, R$^3$ is a straight chain or optionally branched alkane diol or oxaalkanediyl having 2 to 6 carbon atoms, or bivalent oxaalkanediyl radicals derived from diethylene glycol or triethylene glycol, $R^4$ is alkane diol having 2 to 4 carbon atoms, cycloalkane diol of a bivalent aromatic radical having 6 to 10 carbon atoms, and p is from 8 to 11.

20. The abrasion-resistant polyester mixture of claim 18 wherein the thermoplastic polyurethane conforms to the idealized formula V
where $R^1$ is phenylene, naphthylene or a unit of the formulae VIII or IX

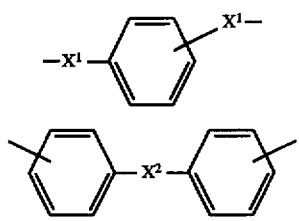

which may each carry substituents,
where $X^1$ is a bivalent aliphatic radical having 1 to 3 carbon atoms and $X^2$ is a direct bond, a bivalent aliphatic radical having 1 to 3 carbon atoms, —CO—, —SO$_2$— or —NH—CO—NH—.

21. The abrasion-resistant polyester mixture of claim 18 wherein the thermoplastic polyurethane conforms to the idealized formula V where $R^1$ is a unit of the formula X

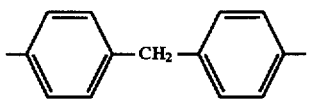

22. The abrasion-resistant polyester mixture of claim 18 wherein the thermoplastic polyurethane conforms to the idealized formula V when the aromatic rings present therein are unsubstituted or carry one or two substituents selected from the group consisting of —SO$_3$H and —CH$_3$.

23. The abrasion-resistant polyester mixture as claimed in claim 1, wherein the polyester contains some, but not all the units derived form terephthalic acid.

24. The abrasion-resistant polyester mixture as claimed in claim 1, suitable for spinning into filaments without appreciable gas evolution and without onset of decomposition of the polyurethane.

25. The abrasion-resistant polyester mixture as claimed in claim 1, wherein said polyester has a glass transition point of 68° to 82° C.

26. The abrasion-resistant polyester mixture as claimed in claim 25, wherein said polyester has a crystallization point of 135° to 155° C.

27. The abrasion-resistant polyester mixture as claimed in claim 1, wherein said polyester has a crystallization point of 135° to 155° C.

28. The abrasion-resistant polyester mixture as claimed in claim 1, wherein said polyester has a melting point within the range from 175° C. to 229° C.

29. A process for producing the abrasion-resistant polyester mixture of claim 1, which comprises combining the polymer components, which may already contain any non-polymeric ingredients to be present, in the desired mixing ratio immediately upstream of the extruder inlet and homogenizing the mixture in the feeding and mixing zone of the extruder screw.

* * * * *